Figure 1:
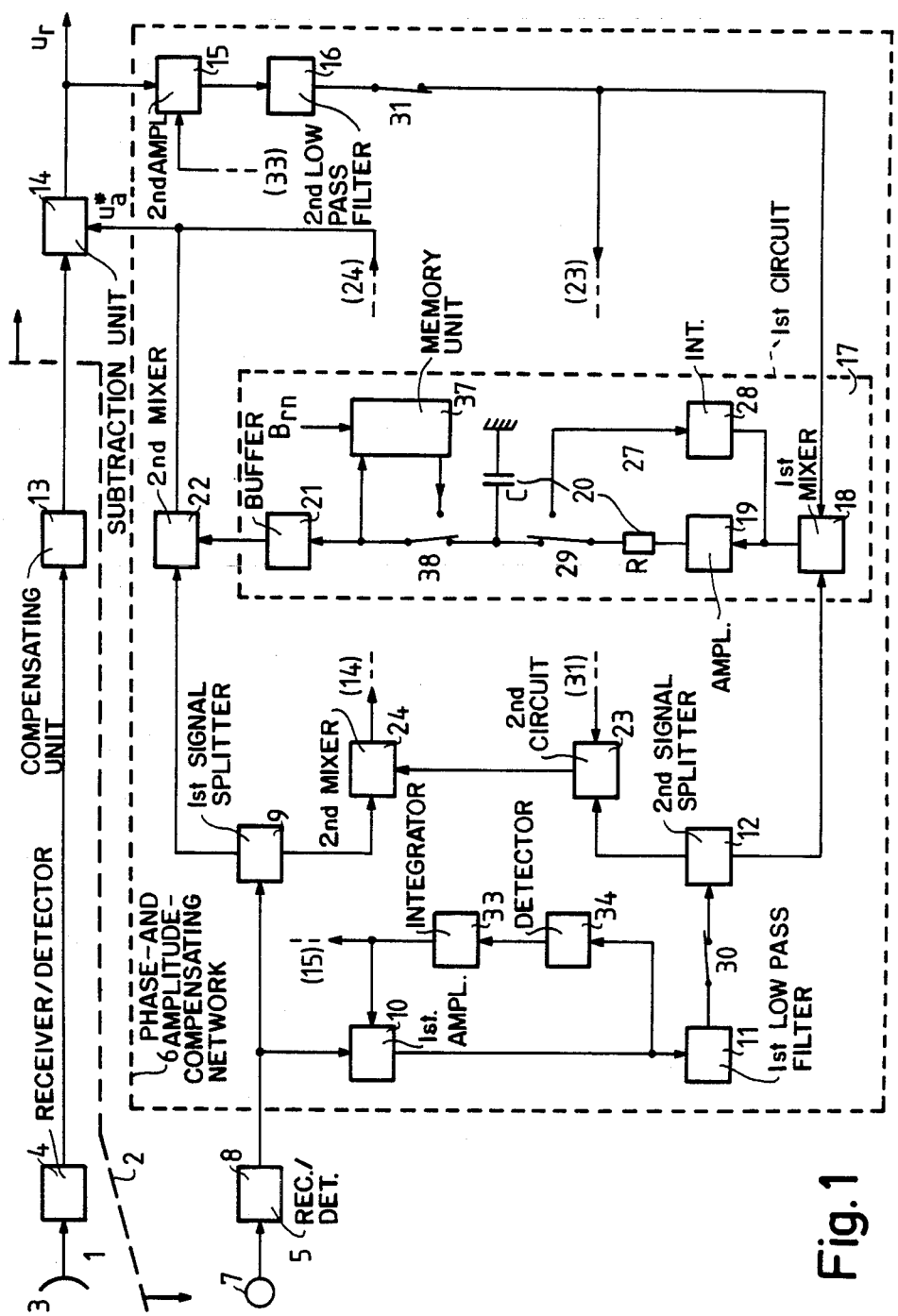

United States Patent [19]

Brilman et al.

[11] Patent Number: 4,554,548
[45] Date of Patent: Nov. 19, 1985

[54] SIDE-LOBE SUPPRESSING UNIT FOR A PULSE RADAR APPARATUS

[75] Inventors: Albert Brilman, Bathmen; Geert Koops, Haaksbergen, both of Netherlands

[73] Assignee: Hollandse Signaalapparaten B.V., Hengelo, Netherlands

[21] Appl. No.: 421,936

[22] Filed: Sep. 23, 1982

[30] Foreign Application Priority Data

Oct. 2, 1981 [NL] Netherlands ............... 8104485

[51] Int. Cl.⁴ ............... G01S 3/16; G01S 13/00; G01S 7/28
[52] U.S. Cl. ............... 343/379; 343/380; 343/381; 343/382; 343/5 NQ; 343/17.2 PC
[58] Field of Search ............... 343/7 A, 5 NQ, 17.1 R, 343/17.2 PC, 379, 380, 381, 382

[56] References Cited

U.S. PATENT DOCUMENTS

| | | | |
|---|---|---|---|
| 3,881,177 | 4/1975 | Len et al. | 343/854 |
| 3,916,408 | 10/1975 | Evans et al. | 343/379 |
| 3,943,511 | 3/1976 | Evans et al. | 343/7 A |
| 3,978,483 | 8/1976 | Lewis et al. | 343/381 |
| 3,982,245 | 9/1976 | Soule et al. | 343/379 |
| 4,010,469 | 3/1977 | Marcum | 343/381 X |
| 4,021,805 | 5/1977 | Effinger et al. | 343/17.2 PC |
| 4,044,359 | 8/1977 | Applebaum et al. | 343/379 |
| 4,057,802 | 11/1977 | Dollinger | 343/379 |
| 4,119,963 | 10/1978 | Zwarts et al. | 343/17.2 PC |
| 4,173,017 | 10/1979 | Burlage et al. | 343/5 NQ X |
| 4,177,464 | 12/1979 | Masak et al. | 343/380 |
| 4,367,472 | 1/1983 | Hauptmann et al. | 343/7 A |

FOREIGN PATENT DOCUMENTS

| | | |
|---|---|---|
| 2635755 | 4/1977 | Fed. Rep. of Germany . |
| 2939257 | 4/1981 | Fed. Rep. of Germany . |
| 2433759 | 3/1980 | France . |

Primary Examiner—Theodore M. Blum
Assistant Examiner—Brian J. Steinberger
Attorney, Agent, or Firm—Robert J. Kraus

[57] ABSTRACT

In a pulse radar apparatus the receiver comprises a main transmission channel connected to a directional antenna and an interference canceller connected to said channel for selecting target returns obtained through the major lobe of the antenna radiation pattern. The canceller contains an auxiliary transmission channel connected to an omnidirectional antenna for the intermediate-frequency detection of target returns and of signals composed of noise and/or continuous-wave interference signals; a subtraction unit; and a phase- and amplitude-compensating network having two circuit arrangements, one for the in-phase output signal and one for the quadrature output signal of the auxiliary transmission channel for generating output signals for the subtraction unit. Each circuit arrangement consists of a first mixer connected to the subtraction unit and the auxiliary transmission channel, a filter connected to the first mixer, and a second mixer connected to the filter and the auxiliary transmission channel.

2 Claims, 3 Drawing Figures

SIDE-LOBE SUPPRESSING UNIT FOR A PULSE RADAR APPARATUS

The invention relates to a pulse radar apparatus, in which the receiver comprises:

a. a main transmission channel connected to a directional antenna for the intermediate-frequency detection of signals composed of target returns and of noise and-/or continuous wave interference signals; and b. an interference canceller connected to the main transmission channel for selecting target returns obtained from the major lobe of the antenna radiation pattern and intermediate-frequency detected; the interference canceller is provided with an auxiliary transmission channel, connected to an omnidirectional antenna, a subtraction unit, and a phase- and amplitude-compensating network; the auxiliary transmission channel is suitable for the intermediate-frequency detection of target returns and of signals composed of noise and/or continuous wave interference signals, and the compensating network for generating—after the supply of output signals from the subtraction unit and the auxiliary transmission channel—output signals for the subtraction unit; the latter output signals are equal in phase and amplitude to the signals derived from the main transmission channel and applied to the subtraction unit, in so far as the output signals of the main transmission channel are weaker than those of the auxiliary transmission channel.

Such a pulse radar apparatus is disclosed in U.S. Pat. No. 4,119,963. The pulse radar apparatus depicted in this patent comprises a narrow-band crystal filter for obtaining a frequency- and phase-dependent control signal to suppress noise and/or continuous wave interference signals; this filter implies the incorporation of an auxiliary oscillator in the phase- and amplitude-compensating network to add to the video signals supplied via the main and the auxiliary transmission channels a frequency difference equal to the natural frequency of the crystal filter. The auxiliary oscillator should thereby be well-balanced with the crystal filter, while the filters in the interference canceller for suppressing the video signals in the sidelobes should be appropriately matched with each other to prevent differences in delay between the signals applied to the phase- and amplitude-compensating network. Moreover, the incorporation of these filters impedes the switching to another intermediate frequency. Furthermore, the presence of the crystal filter does not permit adapting the filter settling time to the nature of the interference. The present invention has therefore for its object the provision of a solution to the above-discussed problem.

According to the invention, the phase- and amplitude-compensating network of the pulse radar apparatus of the type set forth in the opening paragraph comprises two circuits, one for the in-phase output signal and one for the quadrature output signal of the auxiliary transmission channel, each circuit consisting of a first mixer receiving the output signals from the subtraction unit and the auxiliary transmission channel, a filter unit connected to said first mixer, and a second mixer receiving the output signals from said filter unit and the auxiliary transmission channel, and phase- and amplitude-compensating network being suitable for combining the output signals from the two second mixers to obtain output signals to be supplied by said circuit arrangements to the subtraction unit.

It is true that the U.S. Pat. No. 3,881,177 discloses a pulse radar apparatus incoporating an interference canceller in the receiver, which interference canceller also comprises two circuits, one for the supplied in-phase signal and one for the supplied quadrature signal, and a combining network connected to the circuit arrangements. However, this interference canceller is suitable only for cancelling, at radio-frequency level, noise and/or continuous wave interference components in the target returns obtained through the directional antenna; for this purpose an auxiliary oscillator is incorporated for transposing the detected signals into an intermediate frequency especially for the use of the two circuits, while each of these circuits comprises a first IF mixer and a low-pass filter, as well as a second RF mixer, connected to the low-pass filter, to obtain an RF control signal for application to the subtraction unit incorporated in the RF receiver connected to the directional antenna. In this way a purified RF return is obtained, whereby the choice of intermediate frequency is still left open. Such a pulse radar apparatus has however the disadvantage that the isolation between the RF input and the RF output of the second mixers is difficult to realise, so that cancellation of the interference signals will be poor. Furthermore, both for the in-phase and quadrature signals, the phase shift in the path between the omnidirectional antenna and the first mixer via the second mixer should be equal to that in the direct path between this antenna and the first mixer; this is however most doubtful, especially because the RF character of this part and the bandpass filters applied in these paths.

Figure 2:
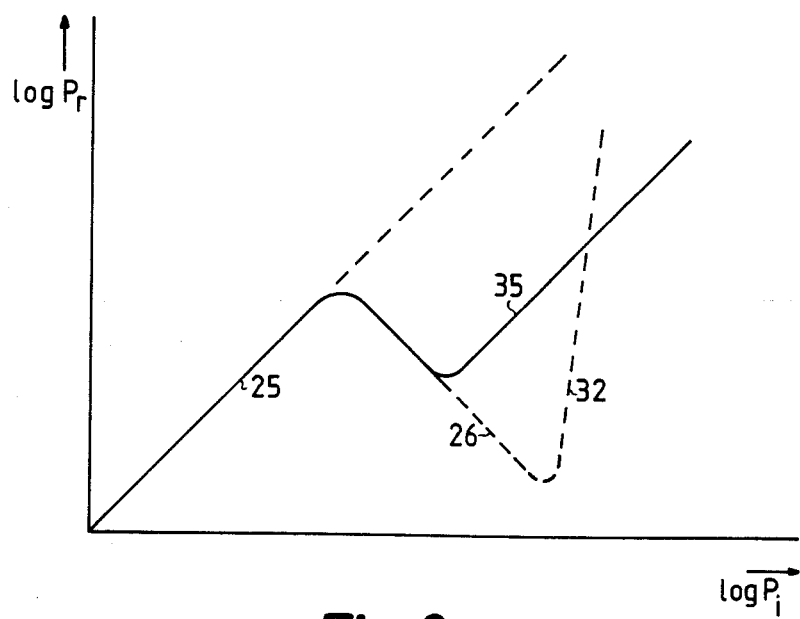
Figure 3:
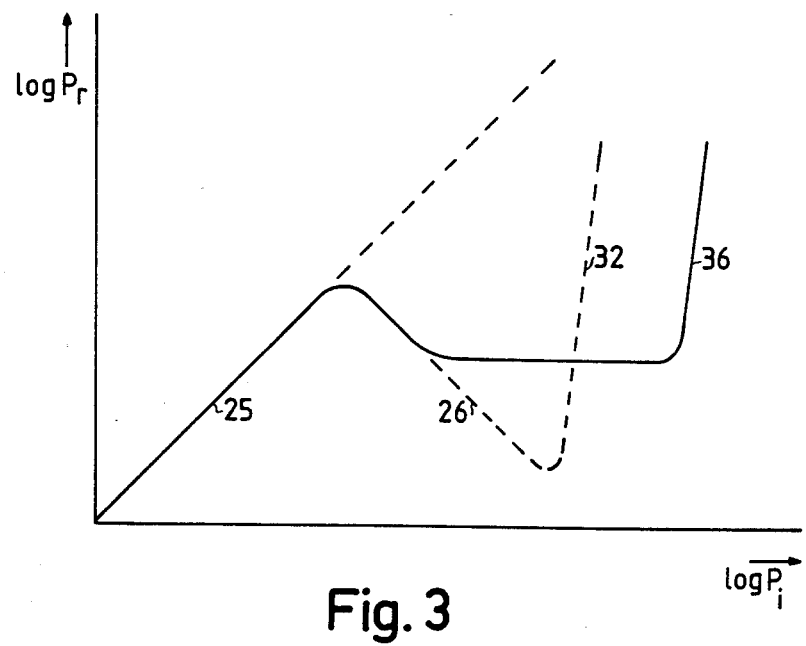

The invention will now be described with reference to the accompanying figures, in which FIG. 1 is a feasible embodiment of a receiver provided with a sidelobe suppressing unit in a pulse radar apparatus;

FIG. 2 shows a characteristic with respect to the suppression of interference signals in the embodiment of FIG. 1; and FIG. 3 shows a characteristic with respect to the suppression of interference signals in a modified embodiment of a receiver provided with a sidelobe suppressing unit in a pulse radar apparatus.

In FIG. 1 the receiver of a pulse radar apparatus comprises a main transmission channel 1 and, connected thereto, an interference canceller 2. The main transmission channel 1 contains at least a directional antenna 3 and a receiver/detector 4, in which the RF signals received by the directional antenna 3 are detected at intermediate frequency, coarsely filtered, and amplified. These RF signals are composed of target returns, noise signals and continuous wave interference signals. The target returns are received principally through the major lobe of the radiation pattern of the directional antenna 3 and the interference signals through the sidelobes of the antenna. For proper detection of a target return, it is desirable to suppress, as much as possible, the IF signal portion corresponding to the interference signals. To this end the interference canceller 2 is provided with an auxiliary transmission channel 5 and a phase- and amplitude-compensating network 6, the auxiliary transmission channel 5 comprising at least an omnidirectional antenna 7 and a receiver/detector 8, in which receiver/detector the radio frequency signals from antenna 7 are detected at intermediate frequency, coarsely filtered and amplified. The IF signal from the receiver/detector 8 is fed to the phase- and amplitude-compensating network 6, in which this signal is fed as $u_a = a \cdot j(t) \cos \omega t$ of amplitude m, complex noise function j(t) and frequency ω, to a first signal splitter 9 and, via a first amplifier 10 and (if necessary) a first low pass filter 11, to a second signal splitter 12. The two signal splitters 9 and 12 produce from the supplied signal two separate components having a mutual phase shift of 90°.

A unit 13 for compensating any differences in delay and amplification of the signals in the two channels 1 and 5 passes the signal $u_m = m \cdot j(t) \cos(\omega t + \phi)$, of amplitude m and phase angle φ, from the receiver/detector 4 to a subtraction unit 14 to suppress the RF signal portion of the interference signals. The output signal $u_r = u_m - u_a^*$ from the subtraction unit 14, where $u_a^*$ is the second input signal of unit 14, is subsequently fed through a second amplifier 15 and second low pass filter 16 to a first circuit 17, which also receives the in-phase signal from the signal splitter 12. Circuit 17 comprises a first mixer 18 to form the mixer product from the two signals applied. In circuit 17 this mixer product passes successively through an amplifier 19 having a gain of 2G, a filter unit 20, such as for example an RC combination, and a buffer 21 for temporary storage of the DC value obtained through filter unit 20.

The DC value provided by the buffer 21 functions as weighting factor $W_I$ for a second mixer 22 connected to circuit 17 to modulate the in-phase signal $a \cdot j(t) \cos \omega t$ from signal splitter 9 in amplitude to form $W_I \cdot a \cdot j(t) \cos \omega t$. Similarly, in a second circuit 23 of the same design as that of circuit 17, the quadrature signal of a second splitter 12 is mixed with the output signal of subtraction unit 14, supplied via filter 16, then amplified and filtered to produce a weighting factor $W_Q$ for a second mixer 24. In mixer 24 the quadrature signal of the first splitter 9 is modulated in amplitude by the control signal of circuit 23 to form the signal $W_Q \cdot a \cdot j(t) \sin \omega t$. The signals produced by mixers 22 and 24 and having a mutual phase shift of 90° are usually of a different amplitude; this will produce the desired control signal $u_a^* = W_I \cdot a \cdot j(t) \cos \omega t + W_Q \cdot a \cdot j(t) \sin \omega t$ for the subtraction unit 14 to correct the phase and amplitude of the target return signal supplied via channel 1. The output signal of subtraction unit 14 thus becomes:

$$u_r = m \cdot j(t) \cos(\omega t + \phi) - W_Q \cdot a \cdot j(t) \sin \omega t - W_I \cdot a \cdot j(t) \cos \omega t.$$

Signal $u_r$, together with the in-phase signal $a \cdot j(t) \cos \omega t$ from splitter 12, gives the mixer product:

$$m \cdot a \cdot j^2(t) \cos(\omega t + \phi) \cos \omega t - W_Q \cdot a^2 \cdot j^2(t) \sin \omega t \cos \omega t - W_I \cdot a^2 \cdot j^2(t) \cos^2 \omega t$$

and, because of the gain 2G and the integrating function of the filter unit 20, results in the relationship:

$$W_I = a \cdot G \cdot m \cdot \overline{j^2(t)} \cos \phi - W_I \cdot a^2 \cdot \overline{j^2(t)} \cdot G$$

to give the weighting factor $$W_I = \frac{a \cdot G \cdot m \cdot \overline{j^2(t)} \cos \phi}{1 + a^2 \cdot \overline{j^2(t)} \cdot G}$$

where $\overline{j^2(t)}$ is the average interference power.

In a similar way the following expression is obtained for the weighting factor $W_Q$:

$$W_Q = -\frac{a \cdot G \cdot m \cdot \overline{j^2(t)} \sin \phi}{1 + a^2 \cdot \overline{j^2(t)} \cdot G}.$$

Substitution of weighting factors $W_I$ and $W_Q$ in the output signal $U_r$ results in:

$$u_r = m \cdot j(t) \cos(\omega t + \phi) \left( \frac{1}{1 + a^2 \cdot \overline{j^2(t)} \cdot G} \right).$$

For the cancellation ratio (C·R), this gives:

$$C \cdot R_{dB} = 20 \log[u_m/u_r] = 20 \log\{1 + a^2 \cdot G \cdot P_j\}$$

where $P_j$ is the average interference power.

With an input power containing only little interference power $P_j$, the $C \cdot R_{dB}$ remains substantially 0, as manifested in FIG. 2 by line 25 inclined at an angle of 45°, which figure illustrates the relationship between the input power $P_i$ supplied as interference power $P_j$ and the output power $P_r$ from subtraction unit 14. With an increasing value of the interference power $P_j$, the second term will determine the value of $C \cdot R_{dB}$. In FIG. 2 this is expressed in the characteristic part 26 declining at an angle of 45°. In practice, deviations may occur in the indicated behavior of the interference canceller 2. Frequently, this is due to the presence of offset voltages at the second mixers 22 and 24, where the relationship for the weighting factor $W_I$, after integration, is given by:

$$W_I = a \cdot G \cdot m \cdot \overline{j^2(t)} \cos \phi - W_I \cdot a^2 \cdot \overline{j^2(t)} \cdot G + U_I,$$

where $U_I$ is the offset voltage for mixer 22.

Hence, the weighting factor may be expressed by:

$$W_I = \frac{a \cdot G \cdot m \cdot \overline{j^2(t)} \cos \phi + U_I}{1 + a^2 \cdot \overline{j^2(t)} \cdot G}.$$

After substitution of the weighting factor $W_I$ in the output signal $u_r$ and the weighting factor $W_Q$ obtained in a similar way and expressed by $$W_Q = -\frac{a \cdot G \cdot m \cdot \overline{j^2(t)} \sin \phi + U_Q}{1 + a^2 \cdot \overline{j^2(t)} \cdot G}$$

where $U_Q$ is offset voltage for mixer 24, the following expression is obtained for output signal $u_r$:

$$u_r = \frac{m \cdot j(t) \cos(\omega t + \phi) - a \cdot j(t) \cdot (U_I \cos \omega t + U_Q \sin \omega t)}{1 + a^2 \cdot \overline{j^2(t)} \cdot G}$$

$$= \frac{m \cdot j(t) \cos(\omega t + \phi) - a \cdot j(t) \cdot \sqrt{U_I^2 + U_Q^2} \cos\left(\omega t + \arctan \frac{U_Q}{U_I}\right)}{1 + a^2 \cdot \overline{j^2(t)} \cdot G}.$$

On account of this formula, a maximum deterioration of the cancellation ratio occurs at:

$$\phi = \arctan \frac{U_Q}{U_I} \pm \pi,$$

for which:

$$C \cdot R_{dB} = 20 \log \left\{ \frac{1 + a^2 \cdot P_j \cdot G}{1 + \frac{a}{m} \sqrt{U_I^2 + U_Q^2}} \right\}.$$

An effective solution to this problem is achieved by providing each of the circuits 17 and 23 with a control unit for cancelling the offset effect. Such a control unit 27 is incorporated in circuit 17. Control unit 27 comprises, for example, an integrator 28, receiving the output voltage of amplifier 19 via a two-position switch 29 and resistor R to produce a cancellation voltage for amplifier 19, while the signal supply from amplifiers 10 and 15 to circuits 17 and 23 is interrupted through switches 30 and 31. Only during a short period at the end of each pulse repetition time the switches 29, 30 and 31 are set to the other position, not shown in the drawing, to allow adjustment of the control voltage produced in integrator 28.

However, with a significant increase in the input power $P_j$ on account of thermal noise signals, the cancellation ratio C.R will be strongly reduced. Consequently, the characteristic 26 takes a sharp turn back towards the continuation of line 25, as shown by line 32, and the suppression of interference signals reduces strongly. Two feasible solutions to prevent this are explained below. A first solution consists of a variable version of amplifiers 10 and 15, where the control voltage for the two amplifiers is provided by an integrator 33, which thereto receives the output signal of amplifier 10 rectified by a detector 34. The operation of the variable amplifiers 10 and 15 with the voltage control circuit constituted by detector 34 and integrator 33 is such that, above a certain average value for the interference amplitude $\sqrt{j^2(t)}$ of the signal supplied to amplifier 10, the signals fed from splitter 12 to the mixers of circuits 17 and 23 are reduced by a factor $K \cdot \sqrt{j^2(t)}$ in amplitude, where K is a constant, to assume the form of $K^{-1} \cos \omega t$ and $K^{-1} \sin \omega t$, respectively. Also the second variable amplifier 15 is supplied with the reduction factor $K \cdot \sqrt{j^2(t)}$ to feed from this side the mixers of circuits 17 and 23 with a signal $1/Ka(u_m - u_a^*)$. As a result, the cancellation ratio C·R obtains the form of:

$$C \cdot R_{dB} = 20 \log \left(1 + \frac{a^2 G}{K^2}\right).$$

This explains the parallel path of part 35 in the characteristic with respect to line 25.

In applying the second solution, it is possible to omit the second variable amplifier 15 and the integrator 33 with detector 34 and to replace the first variable amplifier 10 by a limiting circuit, which is activated as soon as the amplitude of the signal applied to the limiting circuit exceeds a certain value. In such a case, the cancellation ratio assumes the following form:

$$C \cdot R_{dB} = 20 \log(1 + a \cdot K \cdot G \cdot P_j).$$

When $a.K.G.P_j > 1$, this results in $$C \cdot R_{dB} \approx 20 \log \sqrt{P_j} + \text{constant}$$

and hence in a horizontal line 36 in the characteristic of FIG. 3.

Furthermore each of the circuits 17 and 23 may be provided with a detection and memory unit 37 for measuring and recording the weighting factors $W_I$ and $W_Q$ associated with a large number of azimuth values $B_{rn}$, so that during one or several consecutive antenna revolutions the recorded values of weighting factors $W_I$ and $W_Q$ can be utilised for obtaining a presetting in the second mixers 22 and 24, using a two-position switch 38, set to the position not shown in the figure. In such a case, the weighting factors recorded in the detection and memory unit 37 must periodically be reassessed when the radar antenna 3 passes through the azimuth values.

We claim:

1. A pulse radar apparatus having means for suppressing noise signals and continuous wave interference signals in a received signal including target returns, said means comprising:

(a) a main transmission channel electrically-connected to a directional antenna for the intermediate-frequency detection of said received signal; and (b) an interference canceller electrically-connected to said main transmission channel for selecting, from the intermediate-frequency-detected signal, target returns received from the major lobe of the directional antenna radiation pattern, said interference canceller comprising an omnidirectional antenna, an auxiliary transmission channel electrically-connected to the omnidirectional antenna and including means for the intermediate frequency detection of the received signal, a phase and amplitude compensating network electrically-connected to the auxiliary transmission channel, and a subtraction circuit electrically-connected to the main transmission channel and the compensating network, said compensating network responding to output signals from the subtraction circuit and the auxiliary transmission channel by applying to the subtraction circuit output signals which are equal in phase and amplitude to signals applied to the subtraction circuit by the main transmission channel, insofar as the output signals of the main transmission channel are weaker than those of the auxiliary transmission channel;

characterized in that the phase and amplitude compensating network comprises a first circuit electrically-connected to the auxiliary transmission channel and adapted to receive only output signals of a predefined phase, and a second circuit electrically-connected to the auxiliary transmission channel and adapted to receive only output signals of a phase in quadrature with said predefined phase, each of the first and second circuits comprising a first mixer electrically-connected to the subtraction circuit and the auxiliary transmission channel, a filter electrically-connected to said first mixer, and a second mixer electrically-connected to said filter and the auxiliary transmission channel, said phase and amplitude compensating network including means for combining the output signals from the second mixers of the first and second circuits to obtain the output signals applied to the subtraction circuit;

said phase and amplitude compensating network further comprising switching means for interrupting at preset intervals the signal supply from the auxiliary transmission channel to the first mixer of each of said first and second circuits, and wherein the filter of each of said first and second circuits comprises a negative feedback unit operable during said preset intervals for producing a compensating voltage effecting adjustment of an existing offset voltage of the respective filter.

2. A pulse radar apparatus having means for suppressing noise signals and continuous wave interference signals in a received signal including target returns, said means comprising:

(a) a main transmission channel electrically-connected to a directional antenna for the intermediate-frequency detection of said received signal; and (b) an interference canceller electrically-connected to said main transmission channel for selecting, from the intermediate-frequency-detected signal, target returns received from the major lobe of the directional antenna radiation pattern, said interference canceller comprising an omnidirectional antenna, an auxiliary transmission channel electrically-connected to the omnidirectional antenna and including means for the intermediate frequency detection of the received signal, a phase and amplitude compensating network electrically-connected to the auxiliary transmission channel, and a subtraction circuit electrically-connected to the main transmission channel and the compensating network, said compensating network responding to output signals from the subtraction circuit and the auxiliary transmission channel by applying to the subtraction circuit output signals which are equal in phase and amplitude to signals applied to the subtraction circuit by the main transmission channel, insofar as the output signals of the main transmission channel are weaker than those of the auxiliary transmission channel;

characterized in that the phase and amplitude compensating network comprises a first circuit electrically-connected to the auxiliary transmission channel and adapted to receive only output signals of a predefined phase, and a second circuit electrically-connected to the auxiliary transmission channel and adapted to receive only output signals of a phase in quadrature with said predefined phase, each of the first and second circuits comprising a first mixer electrically-connected to the subtraction circuit and the auxiliary transmission channel, a filter electrically-connected to said first mixer, and a second mixer electrically-connected to said filter and the auxiliary transmission channel, said phase and amplitude compensating network including means for combining the output signals from the second mixers of the first and second circuits to obtain the output signals applied to the subtraction circuit;

said first and second circuits each comprising (1) switching means electrically connecting its respective filter and second mixer; and (2) memory means addressable with azimuth data for recording a signal voltage supplied via said switching means;

said switching means having a first position connecting the second mixer to the output of the respective filter and a second position connecting the second mixer to said memory means.

* * * * *